United States Patent [19]

Ohsawa

[11] 3,710,146

[45] Jan. 9, 1973

[54] FREQUENCY DOUBLER CIRCUIT

[75] Inventor: Mitsuo Ohsawa, Kanagawa, Japan

[73] Assignee: Sony Corporation, Tokyo, Japan

[22] Filed: July 7, 1971

[21] Appl. No.: 160,451

[30] Foreign Application Priority Data

July 9, 1970 Japan ....................45/60063

[52] U.S. Cl. ....................307/271, 307/295, 328/20, 330/30 D

[51] Int. Cl. ....................H03k 1/16

[58] Field of Search ....................328/20; 307/295, 271; 330/30 D

[56] References Cited

UNITED STATES PATENTS

| | | | |
|---|---|---|---|
| 3,168,709 | 2/1965 | Sikorra | 330/30 D |
| 3,290,520 | 12/1966 | Wennik | 330/30 D |
| 3,292,098 | 12/1966 | Bensing | 330/30 D |
| 3,371,286 | 2/1968 | Lovelace | 330/30 D |
| 3,548,317 | 12/1970 | Bordonard | 328/20 |
| 3,566,159 | 2/1971 | Plunkett | 307/271 |

*Primary Examiner*—John S. Heyman
*Attorney*—Lewis H. Eslinger et al.

[57] ABSTRACT

A frequency doubler circuit including a differential amplifier supplied with a signal of a predetermined frequency, for example, a pilot signal of 19KHz contained in an FM stereophonic signal, a pair of rectifier circuits coupled to outputs of the differential amplifier to rectify the signal of the predetermined frequency and a combining circuit to combine the rectified signals, whereby a signal of a frequency twice that of the signal supplied to the differential amplifier is derived at the output terminal of the combining circuit.

6 Claims, 5 Drawing Figures

INVENTOR.
MITSUO OHSAWA
BY
Louis H. Eliaga

INVENTOR.
MITSUO OHSAWA
BY
Louis H. Esliger

INVENTOR.
MITSUO OHSAWA
BY

FREQUENCY DOUBLER CIRCUIT

BACKGROUND OF THE INVENTION

1. Field of the Invention

This invention relates to a frequency doubler circuit, and more particularly to a frequency doubler circuit which is suitable for fabrication as an integrated circuit.

2. Description of the Prior Art

One prior art frequency doubler circuit employs an interstage coupling transformer and a pair of diodes interconnected in series but in opposite polarities across a secondary winding of the coupling transformer. A pair of output terminals is connected to the midpoint of the secondary winding and the connection point of the diodes. The primary winding of the coupling transformer is supplied with a signal of a predetermined frequency, for example, a pilot signal of 19KHz contained in an FM stereophonic signal. Accordingly, the diodes are alternately turned on and off by the pilot signal of 19KHz to derive at the output terminals a carrier component of 38KHz, which is subsequently applied to an FM stereo demodulator circuit. Such a conventional frequency doubler circuit, though providing generally adequate performance, is not well suited for integrated circuit manufacture because of the balanced interstage transformer, which would be intolerably bulky and expensive in an integrated circuit environment. That is, fabrication of the frequency doubler circuit as an integrated circuit increases the number of terminals for connecting the transformer with other integrated circuit elements, which inevitably leads to high manufacturing cost and requires care to obtain stable operation of the circuit.

In the case of using the conventional frequency doubler circuit for generating a subcarrier of 38KHz in an FM stereo receiver, the level of the subcarrier fed to a stereo demodulator circuit varies due to changes in the field intensity at the location of the FM stereo receiver, in the level of the pilot signal, and in the voltage supplied, with the result that correct signal separation cannot be achieved and crosstalk is introduced in the right and left channels respectively.

Accordingly, the primary object of this invention is to provide an improved frequency doubler circuit.

Another object of this invention is to provide a frequency doubler circuit which is suitable for fabrication as an integrated circuit.

Another object of this invention is to provide a frequency doubler circuit which is constituted in the form of a differential amplifier to prevent a signal of a fundamental frequency from flowing to an external power source circuit, thereby to avoid unnecessary oscillation.

Another object of this invention is to provide a frequency doubler circuit in which a frequency doubler amplifier includes a differential amplifier to provide an output signal of excellent phase characteristic and constant amplitude at all times.

Another object of this invention is to provide a frequency doubler circuit which is suitable for use in an FM stereo receiver.

Another object of this invention is to provide a frequency doubler circuit capable of providing an FM stereo receiver which is excellent in signal separation and prevention of crosstalk.

Still another object of this invention is to provide a frequency doubler circuit which always provides a signal of constant characteristics irrespective of changes in the level of a fundamental frequency and in power source voltage.

Other objects, features and advantages of this invention will become apparent from the following description taken in conjunction with the accompanying drawings.

SUMMARY OF THE INVENTION

In accordance with the present invention a pair of transistors are connected to form a differential amplifier, rectifiers are connected to output terminals of the transistors respectively and an input signal of a fundamental frequency is supplied to input terminals of the transistors. By alternate conduction of the transistors the rectifiers are alternately rendered conductive and the outputs of the rectifiers are combined together to provide a signal of a frequency twice the fundamental frequency.

DESCRIPTION OF THE PREFERRED EMBODIMENTS

Figure 1:
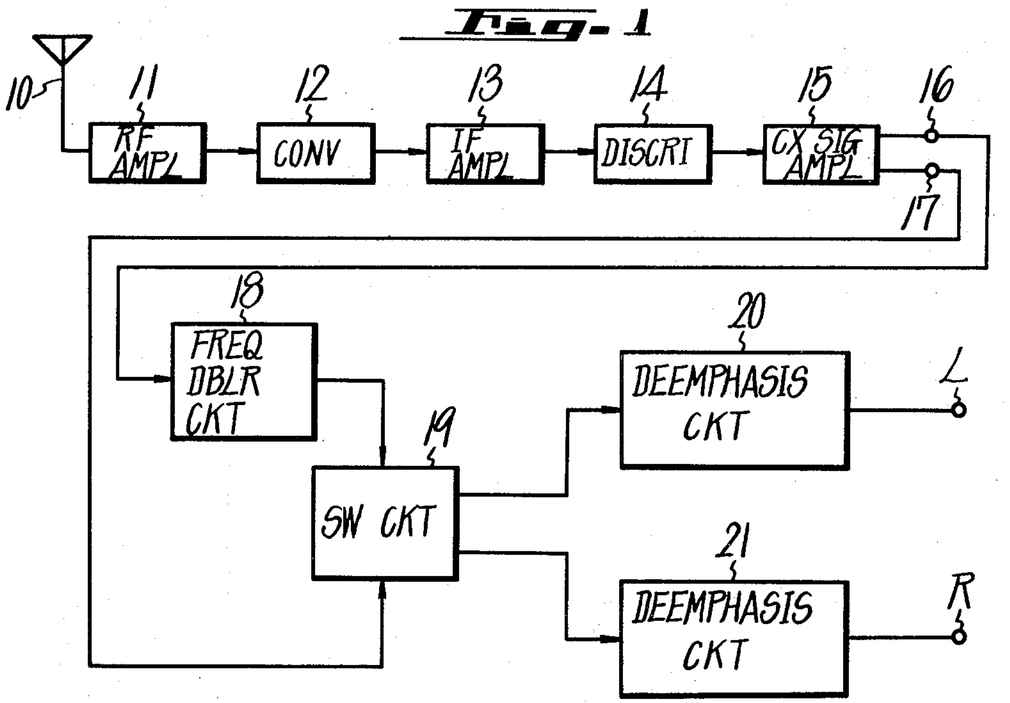
FIG. 1 is a block diagram of an FM stereophonic receiver, for explaining this invention.

FIG. 1 shows a conventional FM stereophonic receiver and will be described first to facilitate a better understanding of this invention. An FM signal is received by an antenna 10 and fed in a conventional manner to a radio frequency (RF) amplifier 11, which includes one or more frequency selecting stages. The output of the RF amplifier 11 is applied to a frequency converter 12 and is thereby converted into an intermediate-frequency signal for subsequent amplification by an intermediate-frequency (IF) amplifier 13 which may consist of a plurality of tuned amplifiers and limiter circuits. The output signal from the IF amplifier 13 is applied to an FM discriminator 14 and is thereby demodulated to provide a stereophonic composite signal.

The stereophonic composite signal derived from the discriminator 14 is composed of three components: an audio frequency component representing the sum (L+R) of left and right audio signals, a 38KHz suppressed-carrier amplitude-modulated component representing the difference (L−R) of the same two audio signals, and a pilot signal of 19KHz. The composite signal is applied to a composite signal amplifier 15 which may include a pilot signal extracting circuit and an SCA filter. The amplifier 15 has two output terminals 16 and 17. The pilot signal of 19KHz separated out by the extracting circuit is supplied through the output terminal 16 to a frequency doubler circuit 18, which serves as a generator of a subcarrier signal of 38KHz. The subcarrier signal of 38KHz is applied to a stereo demodulator or a switching circuit 19 to which the composite signal excluding the output of the SCA filter is also applied by way of the output terminal 17. The composite signal is demodulated by the subcarrier of 38KHz into left and right signals in the switching circuit 19, and the resulting left and right signals are fed to de-emphasis circuits 20 and 21, respectively.

With the foregoing in mind, the present invention will hereinafter be described.

Figure 2:
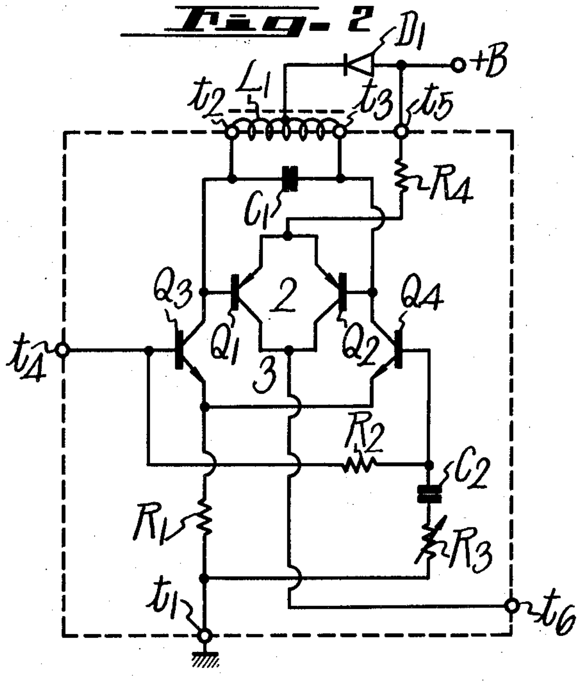
FIG. 2 is a connection diagram showing one example of a frequency doubler circuit of this invention.

In FIG. 2 there is illustrated one example of a frequency doubler circuit of this invention and the portion surrounded by the broken line is produced in the form of an integrated circuit. A pair of transistors $Q_1$ and $Q_2$ provide a full-wave rectifier circuit 2 and the other pair of transistors $Q_3$ and $Q_4$ a differential amplifier 3.

In accordance with the present invention, the differential amplifier 3 is a saturation amplifier and is provided at a stage ahead of the full-wave rectifier circuit 2. The amplitude of a signal of a fundamental frequency, in this case a pilot signal, which is supplied to the full-wave rectifier circuit 2, is held constant by the saturation characteristic of the amplifier 3.

The pair of transistors $Q_3$ and $Q_4$ constituting the amplifier 3 have their emitters interconnected with the connection point grounded through a resistor $R_1$ connected to the ground terminal $t_1$. The collectors of the transistors $Q_3$ and $Q_4$ are connected to terminals $t_2$ and $t_3$, respectively, which are connected to a coil $L_1$. The midpoint of the coil $L_1$ is connected through a diode $D_1$ to a power source terminal. In the embodiment in FIG. 2, the transistors $Q_3$ and $Q_4$ are NPN-type, and therefore the power source terminal is positive as indicated by the designation +B. A capacitor $C_1$ is connected between the terminals $t_2$ and $t_3$ to tune the coil $L_1$ to a stereo pilot signal of 19KHz. One of the transistors, for example the transistor $Q_3$, has its base connected to an input terminal $t_4$ and the other transistor $Q_4$ has its base connected to the input terminal $t_4$ through a resistor $R_2$. A series circuit consisting of a capacitor $C_2$ and a variable resistor $R_3$ of relatively small resistance value is connected between the ground terminal $t_1$ and the connection point of the resistor $R_2$ with the base of the transistor $Q_4$.

Both the emitters and the collectors of the transistors $Q_1$ and $Q_2$ forming the full-wave rectifier circuit 2 are connected directly together. The connection point of the emitters of the transistors $Q_1$ and $Q_2$ is connected through a resistor $R_4$ to a terminal $t_5$ connected, in turn, to the positive power source terminal +B. Further, the connection point of the collectors of the transistors $Q_1$ and $Q_2$ is connected to an output terminal $t_6$ and the bases of the transistors $Q_1$ and $Q_2$ are connected directly to the collectors of the transistors $Q_3$ and $Q_4$, respectively, of the differential amplifier 3.

Thus, the pilot signal of 19KHz supplied to the input terminal $t_4$ is amplified by the transistors $Q_3$ and $Q_4$ in a differential manner because the base of the transistor $Q_4$ is grounded through the series circuit of the capacitor $C_2$ and the resistor $R_3$ of small resistance value in terms of AC and held in a constant-biased condition, deriving pilot signals of opposite phases at the collectors of the transistors $Q_3$ and $Q_4$. Accordingly, while the transistors $Q_3$ and $Q_4$ are alternately turned on and off, the transistors $Q_1$ and $Q_2$ alternately conduct to provide a full-wave rectified output of the pilot signal at the output terminal $t_6$. As a result of this, a switching signal of 38KHz can be obtained at the output of a tuning circuit connected to the output terminal $t_6$.

It will be understood that such a combination of the differential amplifier 3 capable of producing outputs of opposite phases with the full-wave rectifier circuit 2 made up of the pair of transistors $Q_1$ and $Q_2$ employs only one tuning circuit, namely one coil element, which requires only two terminals for connection with the coil and does not greatly increase the number of terminals for external connection of the integrated circuit elements, and hence obviates high manufacturing cost.

Figure 3:
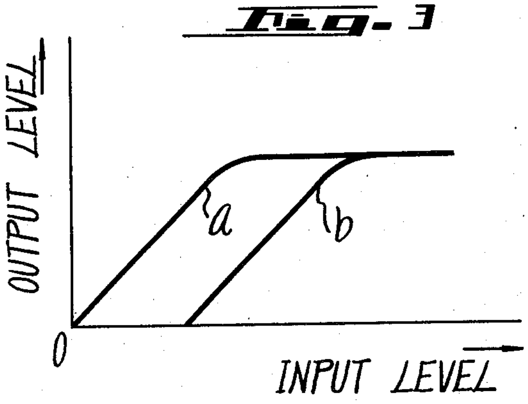
FIG. 3 is a graph, for explaining the operation of the principal part of the circuit exemplified in FIG. 2.

Further, the pilot signal is amplified by the differential amplifier, so that by selecting the input level of the pilot signal fed to the input terminal $t_4$ to be greater than the saturation level of the differential amplifier, it is possible to supply the full-wave rectifier circuit 2 with a pilot signal of a constant level and hold the level of the switching output at a constant value irrespective of a little fluctuation of the pilot signal. It is well-known that the differential amplifier is excellent in saturation characteristic and has a characteristic that causes its output level to be retained substantially flat in the saturation region as depicted in FIG. 3. Therefore, by selecting the level of the pilot signal supplied to the input terminal $t_4$ to exceed the saturation level, it is possible to prevent a change in the level of the pilot signal fed to the full-wave rectifier circuit 2, irrespective of a level change of the incoming pilot signal resulting from a change in the input field. This makes it possible to avoid a level change of the switching signal of 38KHz supplied to the stereo demodulator circuit and helps prevent a change in the phase of the switching of the composite signal caused by an amplitude change of the switching signal or in the flow angle. Thus, occurrence of a change in crosstalk is avoided in the separated left and right signals.

The saturation level of the differential amplifier can be varied by changing the resistance value of the resistor $R_3$ connected to the base circuit of the transistor $Q_4$. With a decrease in the resistance value of the resistor $R_3$, the input and output characteristic of the differential amplifier approaches the curve *a* in FIG. 3. Conversely, an increase in the resistance value causes the characteristic to approach the curve *b*. It is also possible to enhance the rectification efficiency by connecting a diode $D_1$ between the power source and the coil $L_1$ as shown in FIG. 2.

It should be noted that a change in the power source voltage fed to the differential amplifier produces a change in the voltage between the collector and emitter of each of the transistors $Q_3$ and $Q_4$ which changes the amplification and, therefore, changes the output level of the pilot signal. To avoid this, in the present invention the voltages between the collectors and emitters of the transistors $Q_3$ and $Q_4$ making up the differential amplifier are maintained constant irrespective of the change in the power source voltage.

Figure 4:
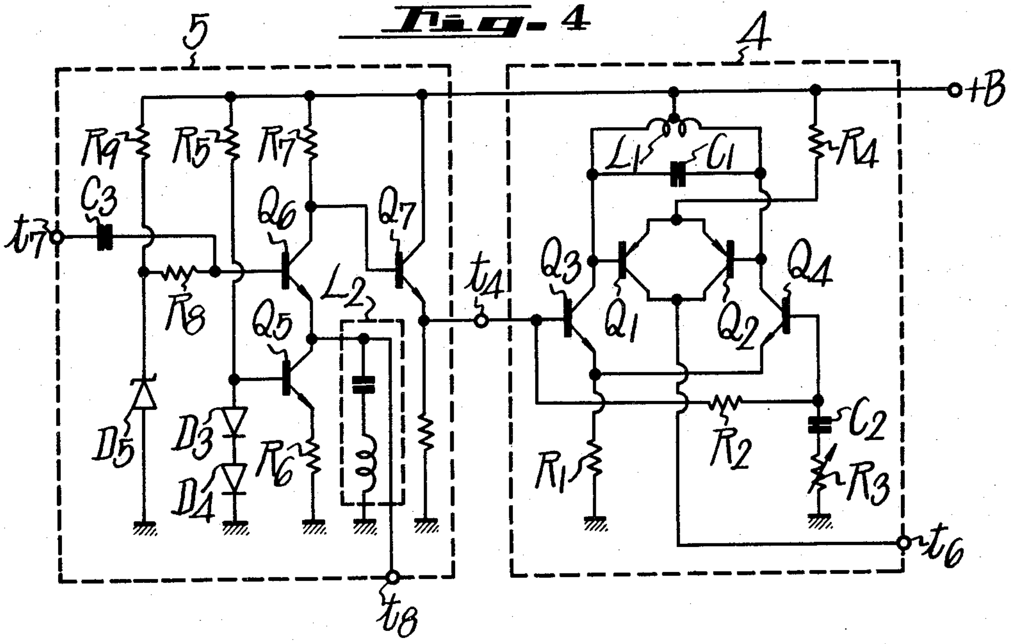
FIG. 4 is a schematic circuit diagram showing one example of the combination of the frequency doubler circuit of this invention and a drive circuit therefor.

To this end, a drive circuit 5 for the frequency doubler circuit 4 is provided as depicted in FIG. 4. The drive circuit 5 comprises a transistor $Q_5$ making up a constant-current source, a transistor $Q_6$ connected in series thereto for amplifying the pilot signal and a series resonant circuit $L_2$ connected in parallel to the constant-current source and resonant at the frequency of the pilot signal.

The base of the transistor $Q_5$ constituting the constant-current source is connected to the connection point of a resistor $R_5$ and diodes $D_3$ and $D_4$ connected in series between the power source +B and ground and is thereby fixed at a predetermined bias. The emitter of the transistor $Q_5$ is grounded through a resistor $R_6$. The collector of the amplifying transistor $Q_6$ is connected to the positive power source +B through a resistor $R_7$ and its base is connected through a resistor $R_8$ to the connection point of a resistor $R_9$ and a Zener diode $D_5$ connected in series between the power source and ground. The base of the transistor $Q_6$ is supplied with an FM-demodulated stereo composite signal from an input terminal $t_7$ through a capacitor $C_3$. An output transistor $Q_7$ is connected directly to the collector of the amplifying transistor $Q_6$. The transistor $Q_7$ is in an emitter follower circuit configuration and its emitter is connected to the input terminal $t_4$ of the differential amplifier.

With such an arrangement, the base bias of the transistor $Q_5$ is held at the conduction voltage of the diodes $D_3$ and $D_4$ irrespective of changes in the power source voltage and the transistor $Q_5$ serves as a constant-current source. Further, in the absence of an input signal the base bias of the transistor $Q_6$ is also held at the Zener voltage of the Zener diode $D_5$ irrespective of changes in the power source voltage, so that the current values of the transistors $Q_5$ and $Q_6$ do not vary, even if the power source voltage changes. Therefore, the voltage drop in the resistor $R_7$ is maintained at a constant value and the emitter potential of the transistor $Q_7$ varies with a potential change at the power source terminal +B to hold constant the voltage between the power source terminal +B and the input terminal $t_4$ at all times. As a result of this, the base potentials of the transistors $Q_3$ and $Q_4$ making up the differential amplifier varies with the change in the power source voltage, by which the voltages between the collectors and emitters of the transistors $Q_3$ and $Q_4$ can be always held constant irrespective of the change in the power source voltage. Accordingly, the amplification of the differential amplifier is held constant independently of changes in the power source voltage.

The stereo composite signal fed to the input terminal $t_7$ is amplified by the transistor $Q_6$. However, since the emitter circuit of the transistor $Q_6$ includes the transistor $Q_5$, the impedance of which can be regarded as substantially infinite, and a series resonant circuit $L_2$ connected in parallel thereto, only a signal of the resonant frequency 19KHz of the series resonance circuit $L_2$, namely the pilot signal, is amplified by the transistor $Q_6$ and obtained from the collector thereof. Accordingly, the input terminal $t_4$ of the differential amplifier is supplied with only the pilot signal superimposed on a predetermined bias.

All the components of the composite stereo signal except the pilot signal are present at the emitter of the transistor $Q_6$. The pilot signal is by-passed by the series resonant circuit $L_2$, but the other components, namely the sum signal R+L of 50 to 15KHz and a suppressed carrier amplitude-modulated signal of the difference signal L—R having a center frequency of 38KHz, are derived at an output terminal $t_8$ without being by-passed by the series resonant circuit $L_2$, and thereafter are supplied to the switching circuit.

As will be apparent from the foregoing, the present invention has a great advantage that since the level of the switching signal of 38KHz fed to the stereo demodulator circuit can be held constant irrespective of a change in the input signal or in the power source voltage, no crosstalk occurs in the right and left signals. Thus, the circuit provides excellent stereophonic reproduction.

Figure 5:
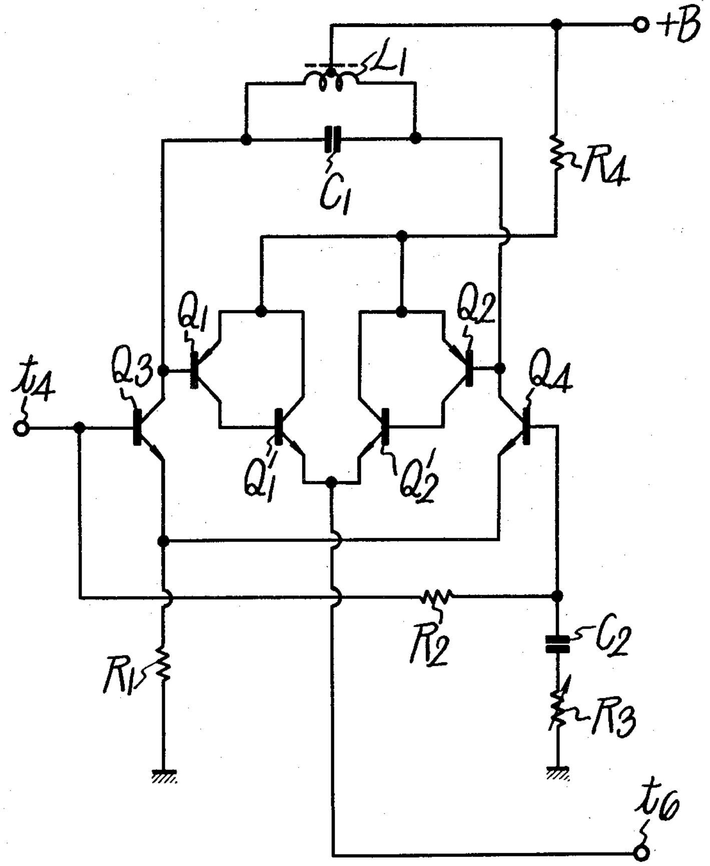
FIG. 5 is a schematic circuit diagram illustrating a modified form of this invention.

Although only two transistors $Q_1$ and $Q_2$ are required in the full-wave rectifier circuit 2, two additional transistors $Q_1'$ and $Q_2'$ opposite in polarity to those $Q_1$ and $Q_2$ may be connected directly to the latter, as shown in FIG. 5. In this case, the input impedance of the full-wave rectifier circuit 2 can be selected to be high, so that the Q of the resonant circuit consisting of the capacitor $C_1$ and the coil $L_1$ can be prevented from lowering. Therefore, the selectivity of the resonant circuit remains high and mixing of other signal components than the pilot signal in the switching signal can be prevented, thus ensuring that a stable switching signal will be obtained.

Further, since the differential amplifier is employed for amplifying the pilot signal, the transistors $Q_3$ and $Q_4$ making up the differential amplifier operate in opposite phases, by which their collector currents become $ic_3 + (-ic_4 = 0$ and their emitter currents $ie_3 + (-ie_4) = 0$. As a result of this, the current flowing in the midpoint of the coil $L_1$ and the current flowing out from the ground terminal $t_1$ are both DC, and the signal of the fundamental frequency, namely the pilot signal component, does not flow in the power source circuit. Thus, even if an internal impedance exists in the DC power source, no pilot signal component will appear across this impedance. Accordingly, the pilot signal component is not likely to be fed back to other circuits, and troubles such as oscillation and the like can be prevented from occurring. Consequently, in the case where the frequency doubler circuit of this invention is produced as an integrated circuit, even if any resistance exists in the power supply lead and in the ground lead, troubles such as oscillation and the like can be prevented, so that the frequency doubler circuit of this invention is suitable for fabrication as an integrated circuit. The capacitor $C_1$ need not always be provided in the integrated circuit but may be connected to the terminals $t_2$ and $t_3$ from the outside as is the case with the coil $L_1$.

It will be apparent that many modifications and variations may be effected without departing from the scope of the novel concepts of this invention.

What is claimed is:

1. In a frequency doubler circuit for FM receivers receiving an FM stereophonic signal frequency-modulated by a composite signal composed of a sum signal of two audit signals, a suppressed-carrier amplitude-modulated signal of a difference signal of the two audio signals and a pilot signal having a frequency one-half that of the suppressed-carrier signal, the improvement comprising:

A. a differential amplifier comprising:

1. first and second transistors connected to power supply terminals, 2. an input circuit supplied with the pilot signal, and
3. first and second output circuits to supply oppositely-polarized output signals corresponding to said pilot signal;

B. tuning means coupled to said output circuits of said differential amplifier and tuned to the frequency of the pilot signal;

C. first and second rectifying means comprising third and fourth transistors having their bases coupled to said output circuits of said differential amplifier and having their emitter-collector circuits connected in parallel for rectifying the oppositely polarized pilot signals from said differential amplifier; and D. an output terminal coupled to said rectifying means for receiving the rectified output signals derived from said rectifying means.

2. A frequency doubler circuit as claimed in claim 1, wherein the first and second transistors are operated into their saturation region.

3. A frequency doubler circuit as claimed in claim 2, wherein:

A. said third and fourth transistors have their base electrodes connected to the collector electrodes of said first and second transistors, respectively;

B. the emitter electrodes of said third and fourth transistors are connected directly to the same power supply terminal as the collectors of said first and second transistors;

C. the collector electrodes of said third and fourth transistors are connected directly together to form said output terminal; and D. said frequency doubler circuit comprises a rectifier connected in series between said same power supply terminal and said tuning means to enhance the rectification efficiency of said rectifier means.

4. A frequency doubler circuit as claimed in claim 1, further comprising:

A. Means for applying the pilot signal to said input circuit of said differential amplifier, said means comprising:
1. a constant-current source device,
2. a series resonant circuit connected in parallel to said constant-current source device and tuned to the frequency of the pilot signal to by-pass the pilot signal, and
3. means connected in series with said constant-current source device for amplifying the pilot signal when supplied with the composite signal.

5. A frequency doubler circuit as claimed in claim 4, wherein said constant-current source device comprises:

A. A transistor; and

B. A diode connected to said transistor for applying a predetermined base bias to its base electrode.

6. A frequency doubler circuit as claimed in claim 4, wherein the pilot signal amplifying means comprises:

A. A transistor; and

B. A Zener diode connected to said transistor for applying a predetermined base bias to its base electrode.

* * * * *